US008510102B2

(12) United States Patent
Kaida

(10) Patent No.: US 8,510,102 B2
(45) Date of Patent: Aug. 13, 2013

(54) INFORMATION PROCESSING APPARATUS, INFORMATION PROCESSING METHOD, AND INFORMATION PROCESSING PROGRAM

(75) Inventor: Yukiko Kaida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1384 days.

(21) Appl. No.: 12/230,509

(22) Filed: Aug. 29, 2008

(65) Prior Publication Data

US 2009/0063136 A1 Mar. 5, 2009

(30) Foreign Application Priority Data

Aug. 31, 2007 (JP) .................................. 2007-225751

(51) Int. Cl.
*G06F 17/21* (2006.01)

(52) U.S. Cl.
USPC .......................................................... 704/10

(58) Field of Classification Search
USPC .................................... 704/1, 9–10
See application file for complete search history.

(56) References Cited

U.S. PATENT DOCUMENTS

| 5,600,835 | A | * | 2/1997 | Garland et al. | ...................... | 1/1 |
| 5,832,478 | A | * | 11/1998 | George | ............................... | 1/1 |
| 7,231,610 | B2 | * | 6/2007 | Kawashima et al. | .......... | 715/780 |
| 7,957,955 | B2 | * | 6/2011 | Christie et al. | ..................... | 704/9 |
| 2010/0174529 | A1 | * | 7/2010 | Bradford et al. | ................ | 704/10 |

FOREIGN PATENT DOCUMENTS

| JP | 2003-067377 | 3/2003 |
| JP | 3889466 | 12/2006 |
| JP | 3933952 | 3/2007 |

OTHER PUBLICATIONS

English language Abstract of JP 2003-233605 dated Aug. 22, 2003.
English language Abstract of JP 10-154033 dated Jun. 9, 1998.

* cited by examiner

*Primary Examiner* — Angela A Armstrong
(74) *Attorney, Agent, or Firm* — Harness, Dickey & Pierce, PLC

(57) ABSTRACT

An information processing apparatus includes a foreign language dictionary, an input unit through which a user input a letter, a determination unit, a storage unit storing notation information about the letter, a search unit, a converter, and an output unit. The foreign language dictionary stores each foreign word in one of uppercase, lowercase, and a combination of at least one uppercase letter and at least one lowercase letter. The determination unit determines whether a letter input through the input unit is uppercase or lowercase. The search unit searches the foreign language dictionary for a word corresponding to an initially input string of letters in the order in which the letters are input. The converter converts a notation of each letter included in the word retrieved by the search unit according to the notation information. The output unit outputs the word in a notation converted by the converter as a candidate word.

13 Claims, 16 Drawing Sheets

FIG. 2

| SEARCH KEY | WORD | WORD TYPE FLAG |
|---|---|---|
| ⋮ | ⋮ | ⋮ |
| economic | economic | 0 |
| us | US | 4 |
| end | end | 0 |
| ec | EC | 4 |
| even | even | 0 |
| america | America | 2 |
| group | group | 0 |
| european | European | 3 |
| george | George | 1 |
| ⋮ | ⋮ | ⋮ |

FIG. 3

| SEARCH KEY | WORD | PRECEDING WORD |
|---|---|---|
| ⋮ | ⋮ | ⋮ |
| apple | apple | — |
| juice | juice | apple |
| company | Company | — |
| ⋮ | ⋮ | ⋮ |

INFORMATION PROCESSING APPARATUS, INFORMATION PROCESSING METHOD, AND INFORMATION PROCESSING PROGRAM

CROSS-REFERENCE TO RELATED APPLICATIONS

This patent specification claims priority from Japanese Patent Application No. 2007-225751, filed on Aug. 31, 2007 in the Japan Patent Office, the entire contents of which are hereby incorporated by reference herein.

BACKGROUND OF THE INVENTION

1. Field of the Invention

The present invention generally relates to information processing apparatuses including computers, facsimile machines, copiers, printers, and multifunction machines including at least two of these functions, information processing method, and an information processing program.

2. Discussion of the Background

An information processing apparatus that includes a dictionary storing multiple words, searches the dictionary for a word corresponding to a letter string input by a user to the information processing apparatus, and displays a searched word is widely used.

However, because each foreign word can be written in multiple ways (hereinafter "notations"), known information processing apparatuses store multiple notations for each word. For example, a word "economic" may be written as "economic" in lowercase, as "ECONOMIC" in uppercase (caps), and as "Economic" with only its first letter capitalized, storage of which requires much memory.

However, if a given word input in any of those ways can be searched and displayed in that way even when each foreign word is registered in one of in lowercase, uppercase, and a combination of at least one lowercase letter and at least one uppercase letter, dictionary memory can be saved without reducing input efficiency.

SUMMARY OF THE INVENTION

In view of the foregoing, in one illustrative embodiment of the present invention, an information processing apparatus includes a foreign language dictionary, an input unit, a determination unit, a storage unit, a search unit, a converter, and an output unit. The foreign language dictionary stores each foreign word in one of uppercase, lowercase, and a combination of at least one uppercase letter and at least one lowercase letter. A user may then input a letter through the input unit to the information processing apparatus. The determination unit is configured to determine whether a letter input through the input unit is uppercase or lowercase. The storage unit stores notation information that indicates whether the letter is uppercase or lowercase. The search unit searches the foreign language dictionary for a word that corresponds to an initially input string of letters in the order in which the letters are input each time a letter is input through the input unit. The converter converts a notation of each letter included in the word retrieved by the search unit according to the notation information stored in the storage unit. The output unit then outputs the word in a notation converted by the converter as a candidate word.

In another illustrative embodiment of the present invention, an information processing method includes inputting a letter, determining whether the letter is uppercase or lowercase, storing notation information indicating whether the letter is uppercase or lowercase, searching a foreign language dictionary in which multiple words of a foreign language are registered in one of uppercase, lowercase, and a combination of at least one uppercase letter and at least one lowercase letter for a word that corresponds to an initially input string of letters in the order in which the letters are input each time a letter is input, converting a notation of each letter included in the word retrieved by the search unit according to the stored notation information, and outputting the word whose notation is converted as a candidate word.

In yet another illustrative embodiment of the present invention, a computer-readable recording medium stores a program. The program is configured to cause a computer to perform the processes described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2 illustrates an example of a format of a dictionary shown in FIG. 1;

FIG. 3 illustrates an example of a format of a history storage unit shown in FIG. 1;

DETAILED DESCRIPTION OF PREFERRED EMBODIMENTS

Figure 1:
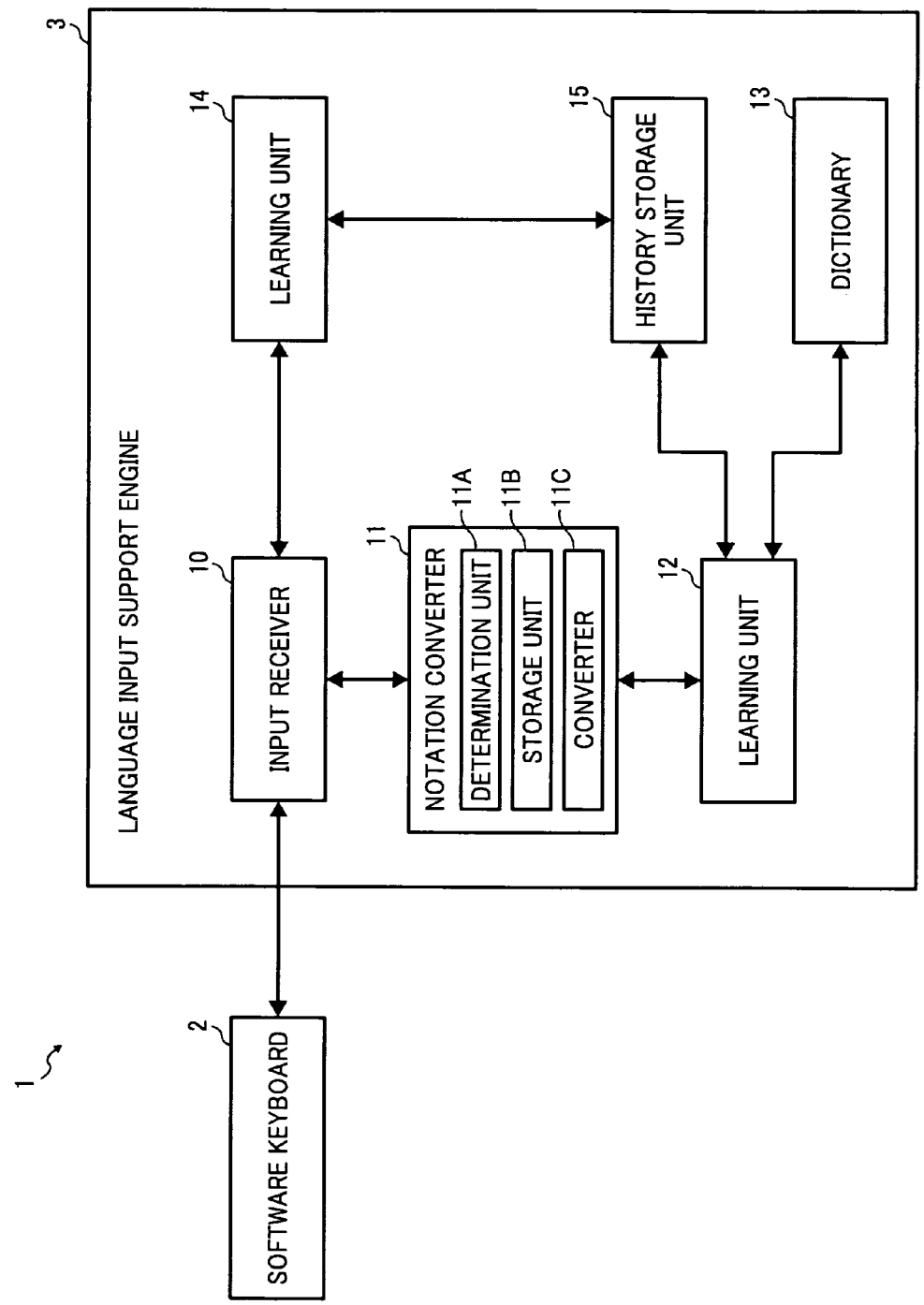
FIG. 1 is a block diagram illustrating an example of a functional configuration of a main part of an information processing apparatus according to an illustrative embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

It is to be noted that the terms "foreign language" and "foreign word" used in this specification mean languages and words including upper case letters (or characters) and lower case letters (or characters).

Referring now to the drawings, wherein like reference numerals designate identical or corresponding parts throughout the several views thereof, and particularly to FIG. 1, an information processing apparatus 1 according to an example embodiment of the present invention is described.

FIG. 1 is a block-diagram illustrating a functional configuration of a main part of the information processing apparatus 1.

The information processing apparatus 1 can be one of a computer, a facsimile machine, a copier, a printer, and a multifunction machine including at least two of these functions and has a function to search a dictionary for a word that corresponds to a letter string input by a user and displays the corresponding word.

As shown in FIG. 1, the information processing apparatus 1 includes a software keyboard 2 and a language input support engine 3. The software keyboard 2 serves as an input unit and includes a display on which various keys and a display area are displayed. The user touches the keys to input letters, and various information including those letters input by the user is output to the language input support engine 3.

The language input support engine 3 includes an input receiver 10 serving as an output unit, a notation converter 11, a search unit 12, a dictionary 13 including one or multiple foreign language dictionaries, a learning unit 14, and a history storage unit 15. The notation converter 11 includes a determination unit 11A, a storage unit 11B, and a converter 11C.

The language input support engine 3 searches the dictionary 13 for a word according to the information including the letters input by the user and outputs the word to the software keyboard 2, and then the software keyboard 2 displays the word as a choice.

It is to be noted that the description below concerns input of foreign languages using words that are composed phonetically, as a combination of multiple letters, such as an alphabet, and thus ideographic languages such as Chinese are excluded. In addition, although English is selected as the example in the description below, the illustrative embodiments of the present invention can accommodate German, French, etc.

Further, it is to be noted that Japanese can be input in the information processing apparatus according to illustrative embodiments of the present invention through known methods, and descriptions thereof are omitted.

The input receiver 10 can be implemented by a computer including a central processing unit (CPU), a read-only memory (ROM), and a random access memory (RAM). The ROM is a computer-readable recording medium storing a program including a procedure to execute various functions regarding the present embodiment. An information processing method according to the present embodiment can be executed when the CPU reads the program and operates according to the program, executing those functions.

It is to be noted that the program described above can be readily introduced to computers by distributing computer-readable recording media storing the program.

FIG. 2 illustrates an example of a format of the dictionary 13.

The dictionary 13 is a memory that stores Japanese words, various signals, and multiple foreign words. Each foreign word is registered in one of multiple notations, which in the present embodiment are lowercase, uppercase, and a combination thereof.

As shown in FIG. 2, for example, a letter string "economic" is stored in the dictionary 13 in lowercase, and associated with a search key "economic" and a word type flag "0". As described above, each word is stored in lowercase, uppercase, or a combination thereof.

The search key is a letter string in lowercase, used to search for a word corresponding to a letter string input by the user through the software keyboard 2. The word type flag indicates word type, in which the numerals 0, 1, 2, 3, and 4 indicate ordinary words, names of people or companies, place-names, proper nouns other than names of people, companies, and places, and abbreviations, respectively, in the present embodiment.

FIG. 3 illustrates an example of a format of the history storage unit 15.

The history storage unit 15 is another memory, and keeps histories of words selected from candidates displayed on the software keyboard 2 and words input through the software keyboard 2 and confirmed.

As shown in FIG. 3, in the history storage unit 15, each word is stored in association with a search key and a preceding word that is confirmed immediately before that word is selected or confirmed. For example, a word "juice" can be stored in the history storage unit 15 in association with a search key "juice" and a preceding word "apple".

It is to be noted that, in this case, "juice" is a subsequent word of "apple".

Figure 4:
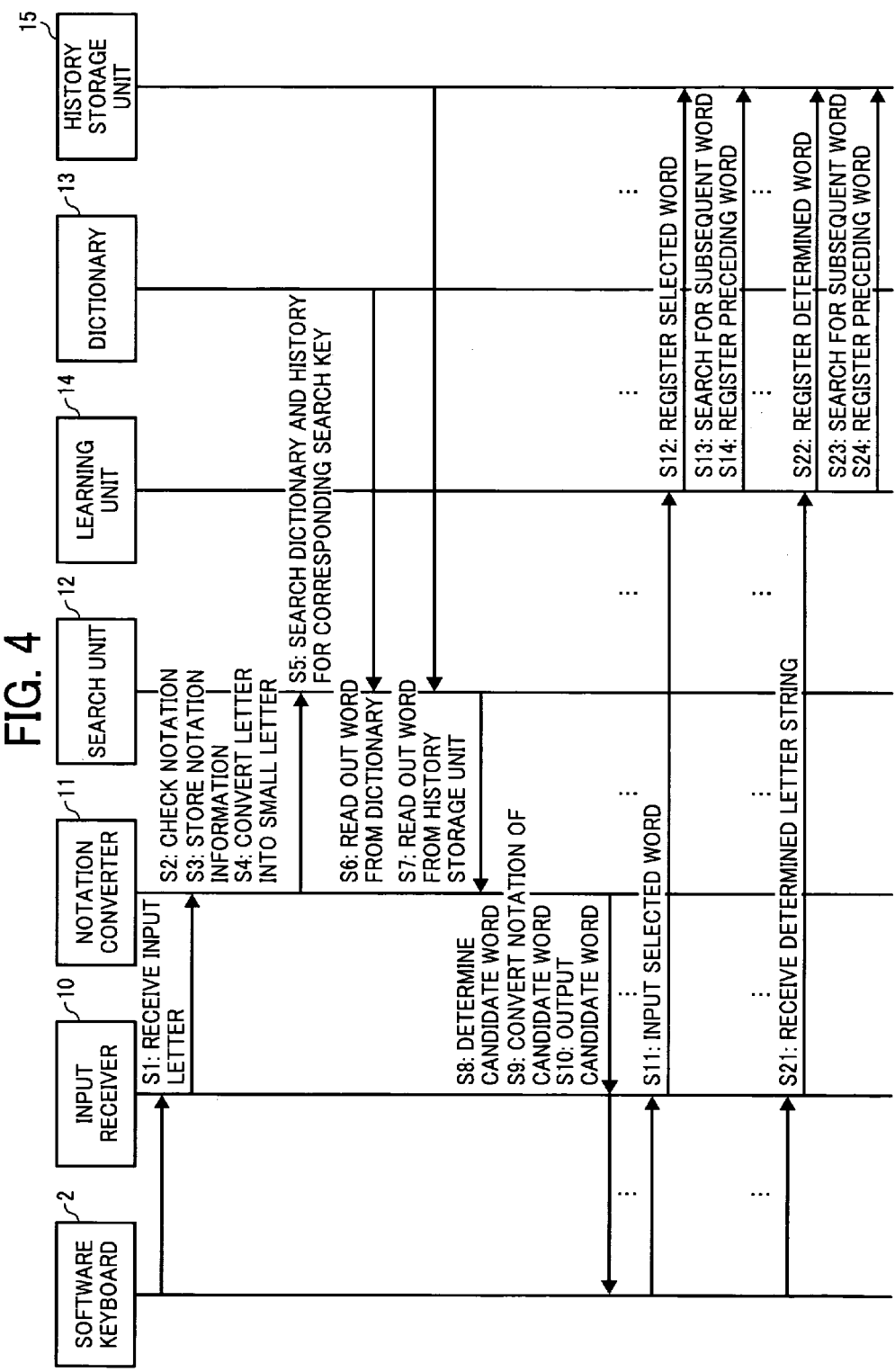
FIG. 4 illustrates a sequence of foreign word handling processes performed by the information processing apparatus shown in FIG. 1.

A sequence of foreign word handling processes performed by the information processing apparatus 1 shown in FIG. 1 is described below with reference to FIG. 4.

When the user inputs a foreign letter through the software keyboard 2, at S1 the input receiver 10 of the language input support engine 3 receives the input letter and outputs the letter to the notation converter 11.

At S2, the determination unit 11A of the notation converter 11 determines whether the input letter is lowercase or uppercase, and at S3, the storage unit 11B stores determination results as notation information.

When the letter is uppercase, at S4, the converter 11C of the notation converter 11 outputs that letter in lowercase to the search unit 12. By contrast, when the letter is lowercase, the notation converter 11 outputs that letter to the search unit 12 without converting it.

At S5, the search unit 12 refers to each search key stored in the dictionary 13 and searches for search keys whose first letter corresponds to the input letter, and further searches the history storage unit 15 for search keys whose first letter corresponds to the input letter. More specifically, regarding a first letter of a letter string, the search unit 12 refers to a first letter of each search key. When the user then inputs a second letter, the search unit 12 refers to a second letter of each search key whose first letter corresponds to the first input letter.

At S6, the search unit 12 retrieves a word and a word type flag that are associated with the search key from the dictionary 13 and, at S7, retrieves a word associated with the search key from the history storage unit 15.

Thus, each time the user inputs a letter, the search unit 12 searches the dictionary 13 and the history storage unit 15 for a word that corresponds to an initially input letter or string of letters in the order in which the letters are input.

It is to be noted that the word that corresponds to the initially input string of letters means a word whose initial letter or initial letters are identical to the initial input letter or string of letters in the order in which the letters are input, regardless of its notation. For example, when the user initially inputs "e", "economic", "end", "EC", "even", and "European" are retrieved from the words shown in FIG. 2.

Then, the search unit 12 outputs the words retrieved from the dictionary 13 and the history storage unit 15, respectively, to the notation converter 11.

At S8, the notation converter 11 determines candidate words based on the word and the word type flag input from the search unit 12, and, at S9, converts that word according to the notation information stored therein, if necessary.

More specifically, regarding the notation information about the first letter of the input letters, the notation converter 11 converts the first letter of the candidate word according to that notation information. For example, when the notation information indicates uppercase, the notation converter 11 capitalizes the first letter of the candidate word. By contrast, when the notation information indicates that the letter is lowercase, the notation converter 11 does not convert the first letter of the candidate word.

At S10, the notation converter 11 outputs the candidate word or a preceding word corresponding to the candidate word to the software keyboard 2.

Then, when the search unit 12 finds one or more candidate words, the software keyboard 2 displays the one or more candidate words input from the input receiver 10 of the language input support engine 3. When the user selects one of those candidate words, the software keyboard 2 outputs the selected word to the language input support engine 3.

At S11, the input receiver 10 receives the selected word and then outputs the selected word to the learning unit 14. At S12, the learning unit 14 stores the word (currently selected word) input from the input receiver 10 in the history storage unit 15 without changing its notation. In the history storage unit 15, the word is registered in association with the search key.

At S13, the history storage unit 15 is searched for a word registered as a subsequent word of the currently selected word. In other words, when the currently selected word is previously registered as a preceding word of a given word in the history storage unit 15, the given word is retrieved. Then, the retrieved word is displayed on the software keyboard 2 as a candidate word to follow the selected word.

For example, when the user selects "apple" and it is assumed that the history storage unit 15 stores a previous record of "apple juice", in which "apple" is a preceding word and "juice" is a subsequent word of "apple". In this case, the learning unit 14 records "apple" at S12 as a currently selected word, and at S13 the history storage unit 15 is searched and a previous record of "apple" registered as a preceding word is referenced. Accordingly, the previous record of "apple juice" is referenced, and "juice" is retrieved and then displayed on the software keyboard 2 as a candidate word of the subsequent word of "apple".

At S14, when the user selects the candidate word (juice), the candidate word serves as a subsequent word of the currently selected word (apple) in the history storage unit 15. Subsequently, the currently selected word (apple) is registered as the preceding word of that candidate word (juice).

By contrast, when the user does not select one of the candidate words of the subsequent word, the processes performed from S1 through S20 are repeated.

Further, when the user confirms the input letter string without selecting one of the candidate words, at S21, the input receiver 10 of the language input support engine 3 receives the confirmed letter string and outputs that letter string to the learning unit 14.

At S22, the learning unit 14 registers the letter string (word) input from the input receiver 10 as a currently confirmed word without changing its notation, and a search key is associated therewith.

At S23, the learning unit 14 searches the history storage unit 15 for a subsequent word. More specifically, when the history storage unit 15 stores a record of the currently confirmed word registered as a preceding word of a given word, that given word is displayed as a candidate word of the subsequent word. At S24, when the user selects the candidate word, the candidate word serves as the subsequent word of the currently confirmed word. Subsequently, the currently selected word is registered as the preceding word of that candidate word.

Figure 5:
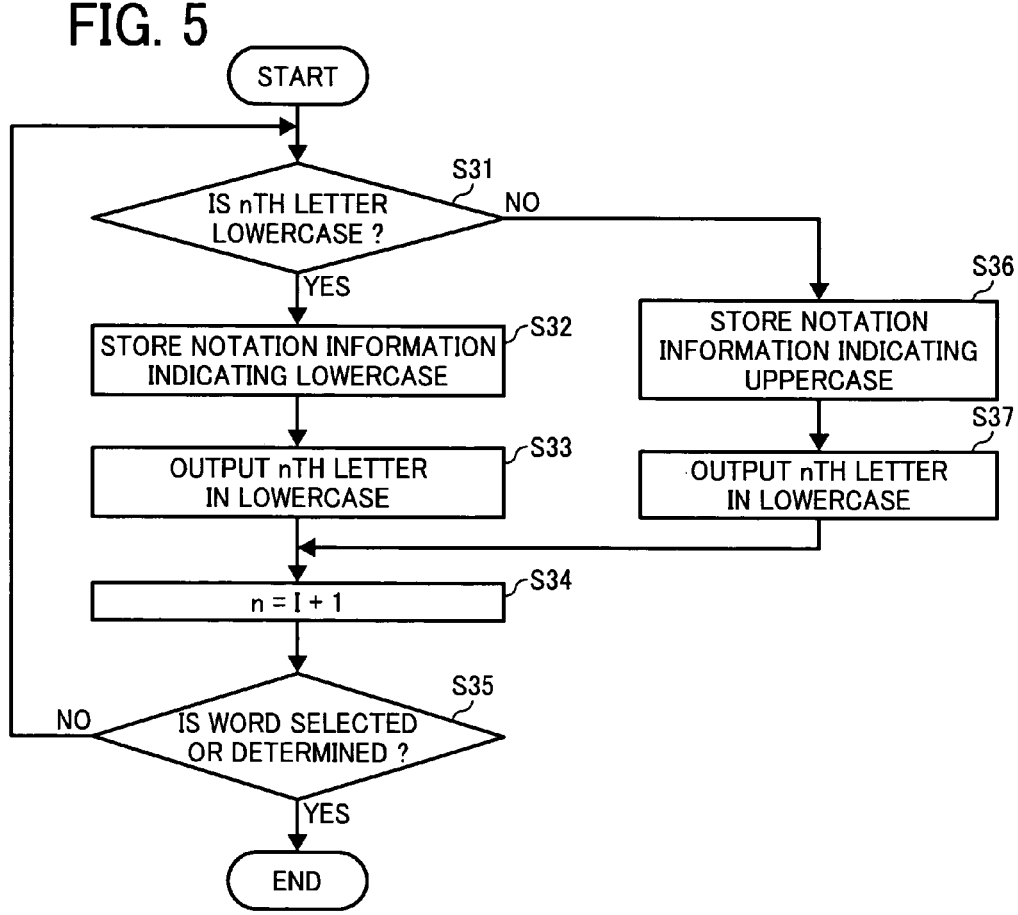
FIG. 5 illustrates a sequence of input letter handling processes performed by a notation converter shown in FIG. 1.

FIG. 5 illustrates a sequence of input letter handling processes performed by the notation converter 11 shown in FIG. 1.

At S31, the determination unit 11A of the notation converter 11 determines whether or not an nth letter of a letter string input by the user is lowercase, wherein n is a given positive integer. When the nth letter is lowercase (YES at S31), the storage unit 11B of the notation converter 11 stores notation information indicating that the nth letter is lowercase at S32 and the nth letter is output to the search unit 12 without converting its notation.

By contrast, when the determination unit 11A determines that the nth letter of the letter string is uppercase (NO at S31), at S36, the storage unit 11B stores notation information indicating that the nth letter is uppercase. At S37 the converter 11C converts the nth letter and the notation converter 11 outputs the nth letter in lowercase to the search unit 12.

Then, at S34, the notation converter 11 increases n by one. At S35, the notation converter 11 determines whether or not the user has selected one of the candidate words or confirmed the input letter string. When the user neither selects one of the candidate words nor confirms the input letter string (NO at S35), the notation converter 11 returns to S31. By contrast, when one of the candidate words is selected or the input letter string is confirmed (YES at S35), processing is completed.

Figure 6:
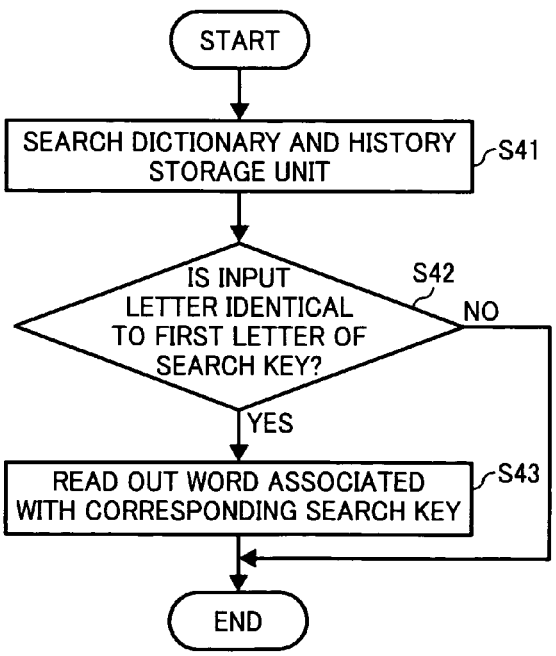
FIG. 6 illustrates a sequence of search processes performed by a search unit shown in FIG. 1.

FIG. 6 illustrates a sequence of processes performed by the search unit 12 shown in FIG. 1.

At S41, the search unit 12 searches the dictionary 13 and the history storage unit 15 for a letter or a letter string input from the notation converter 11. At S42, the search unit 12 determines whether or not the input letter or letter string is identical to the first letter or first several letters of any search key stored therein. When the input letter or letter string is not identical to the first letter or first several letters of any search key, the search unit 12 ends processing.

By contrast, when there is a search key whose first letter or first several letters are identical to the input letter or letter string, at S43, the search unit 12 retrieves a word and a word type flag that are associated with that search key from the dictionary 13 and the history storage unit 15. The word and the word type flag thus retrieved are output to the notation converter 11, and then the search unit 12 ends processing.

Thus, in the dictionary 13 and the history storage unit 15, each word is stored in association with a search key that is the word itself displayed in lowercase. The notation converter 11 converts the letter string input from the input receiver 10 into lowercase if necessary, and the search unit 12 searches the dictionary 13 and the history storage unit 15 for a word associated with a search key that corresponds to the input letter or letter string converted into lowercase.

Figure 7:
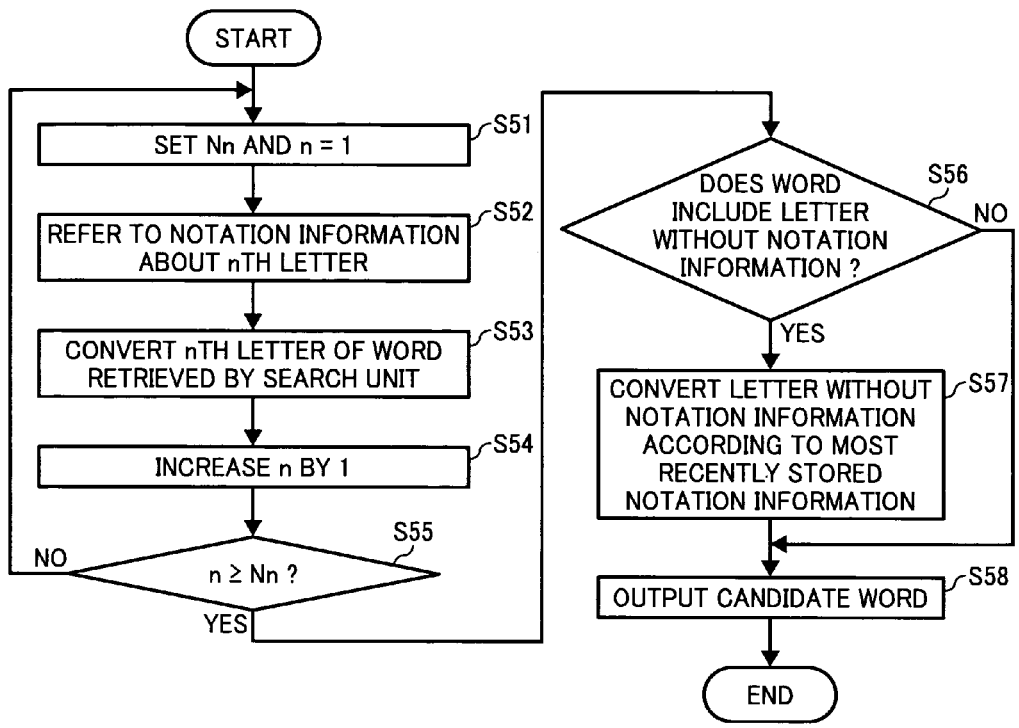
FIG. 7 illustrates a sequence of candidate word output processes performed by the notation converter shown in FIG. 1.

FIG. 7 illustrates a sequence of processes performed by the notation converter 11 to output candidate words.

At S51, the notation converter 11 sets Nn that is a number of letters input by the user, and n is initially set to 1. At S52, the notation converter 11 refers to the notation information about a nth letter of the letter string input by the user. At S53, the notation converter 11 converts the notation of the nth letter of the word that is retrieved by the search unit 12 according to the notation information referred to at S52.

It is to be noted that, at S53, the notation converter 11 does not convert the nth letter of the word when its notation is identical to that indicated by the notation information.

At S54, the notation converter 11 increases n by one (n=1+1), and at S55 determines whether or not n is not less than Nn. When n is less than Nn (NO at S55), the notation converter 11 repeats the processes from S52 through S55.

By contrast, when n is not less than Nn (YES at S55), at S56, the notation converter 11 checks whether or not the word includes a letter whose notation information is not stored.

When the notation information of all letters of the word is stored (NO at S56), at S58 the notation converter 11 outputs the word notated according to the notation information as a candidate word to the input receiver 10.

By contrast, when the word includes a letter without notation information (YES at S56), at S57, the notation converter 11 converts that letter whose notation information is not stored according to the notation information that is most recently stored regarding that input letter string.

For example, when the user inputs "Ja", notation information about the first letter, indicating uppercase, and notation information indicating that the second letter is lowercase, are stored. Therefore, when the search unit 12 searches the dictionary 13 and finds a word "JAPAN", the converter 11C sets the first letter "J" as is and converts the second letter into lowercase "a".

It this case, there is no notation information corresponding to the third and subsequent letters, and regarding the letter string input by the user, a most recently stored notation information is about the second letter "a". Thus, the converter 11C converts the third and subsequent letters "PAN" into lowercase letters, and thus "Japan" is set as a candidate word.

At S58, the candidate word whose notation has been converted is output to the input receiver 10, at which point processing is completed. The candidate word thus received by the input receiver 10 is output to the software keyboard 2 and then listed on the display area of the software keyboard 2.

As described above, the notation converter 11 stores the notation information indicating whether the letter input by the user is uppercase or lowercase, and each letter of the candidate word retrieved from the dictionary 13 is set in either uppercase or lowercase according to the notation information. The candidate word is displayed without being converted when the notation of the letter input by the user is identical to that of the candidate word. Thus, the candidate word can be displayed in the notation identical to that of the input letters without necessitating an increase in the storage capacity of the dictionary 13.

Further, in the dictionary 13, a search key is associated with each word, and the notation of search keys of all word stored therein is identical. When a letter string to be searched for can be generated based on the letter string input by the user with the notation corresponding to that of the input letter string, the dictionary 13 can be searched without regard for the notation of the input letter string.

Further, when one of the candidate words retrieved from the dictionary 13 is selected, that word and its notation are stored in the history storage unit 15 as a history, and in subsequent searches, that word is displayed in the notation stored in the history storage unit 15. Thus, candidate words can be displayed in a previously used notation preferentially.

Moreover, when the user completes inputting letters without selecting any of the candidate words, the dictionary 13 stores that letter string in the notation used by the user. Next time a word corresponding to that letter string is retrieved as a candidate word, that word can be displayed in a previously input notation preferentially by using the notation thus stored.

Further, when the user selects one of the candidate words, a notation of a word confirmed prior to the selected candidate word can be stored as a preceding word and, in subsequent searches, the word can be displayed in the previously-used notation. It is to be noted that the selected word is stored in the history storage unit 15 as well.

For example, when the user confirms a given word A displayed in a notation A1 and then selects a given word B displayed in a notation B1 from the candidate words, the history storage unit 15 stores the word A displayed in the notation A1 and the word B displayed in the notation B1 as a set, in which the word A is registered as a preceding word of the word B.

Thus, next time the word A displayed in the notation A1 is confirmed, the word B is retrieved from the history storage unit 15 and displayed in the notation B1 as a candidate word of a word subsequent to the word A.

Another candidate word processing performed by the notation converter 11 shown in FIG. 1 is described below with reference to FIG. 8.

In this processing, when the notation converter 11 determines that a first letter input by the user is lowercase, the notation converter 11 outputs the words retrieved by the search unit 12 from the dictionary 13 and the history storage unit 15 as candidate words without changing their notations.

As described above, when the user inputs a first letter through the software keyboard 2, the letter is accepted by the input receiver 10 and output to the notation converter 11. Further, the search unit 12 retrieves words corresponding to the input letter from the dictionary 13 and the history storage unit 15 and then outputs the words to the notation converter 11.

Figure 8:
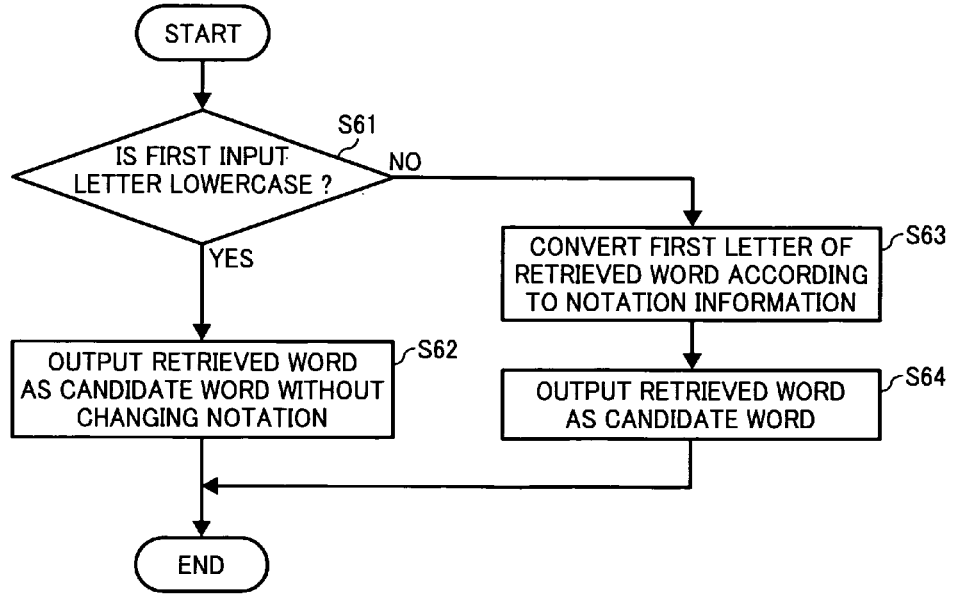
FIG. 8 illustrates another sequence of candidate word output processes performed by the notation converter shown in FIG. 1.

Referring to FIG. 8, when the notation converter 11 accepts the words retrieved by the search unit 12, at S61 the notation converter 11 checks whether or not the first input letter is lowercase. When the first input letter is lowercase (YES at S61), at S62 the notation converter 11 outputs the words retrieved by the search unit 12 as candidate words to the input receiver 10 without changing their notations.

By contrast, when the notation converter 11 determines that the first input letter is not lowercase, that is, the first input letter is uppercase (NO at S61), at S63, the notation converter 11 converts the notation of the first letter of each retrieved word according to the notation information. In this case, the notation converter 11 capitalizes the retrieved words. At S64, the notation converter 11 outputs the words thus capitalized to the input receiver 10 as candidate words.

Thus, by configuring the notation converter 11 not to convert the words retrieved by the search unit 12 when the user inputs only a single letter and the letter is lowercase, each candidate word is displayed in a notation generally used in dictionaries or a once confirmed notation.

Figure 9:
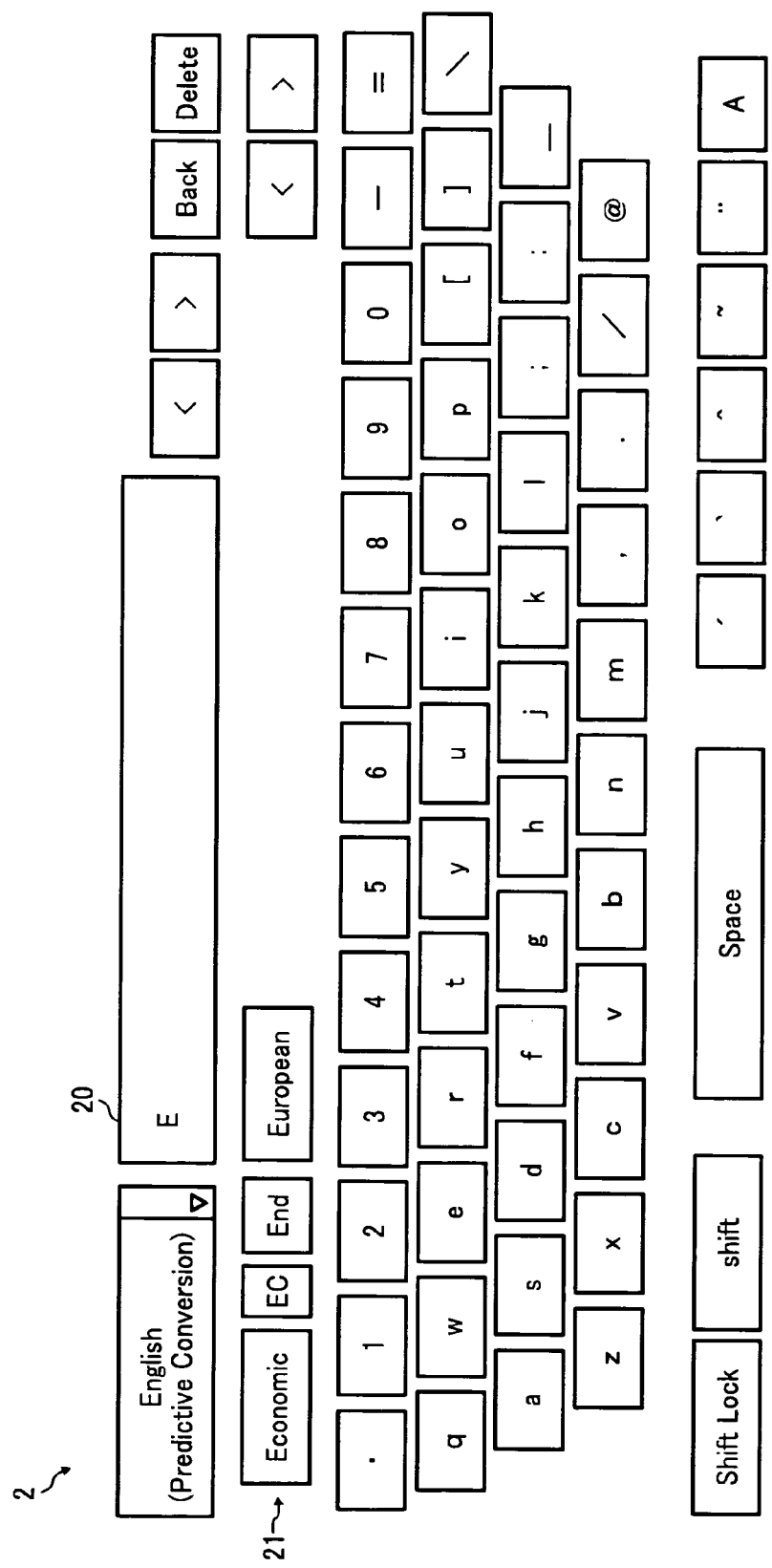
FIG. 9 illustrates examples of candidate words displayed on the software keyboard shown in FIG. 1 when a user inputs "E" in uppercase.

FIG. 9 illustrates examples of candidate words displayed on the software keyboard 2 when the user inputs a first letter in uppercase. In this case, the first letters of candidate words are capitalized.

As shown in FIG. 9, the software keyboard 2 includes a letter entry field 20 and a candidate word field 21. When the user inputs a first letter "E" in the letter entry field 20, for example, "Economic", "EC", "End", "European", etc., are displayed as candidate words in the candidate word field 21.

It is to be noted that a candidate word whose first letter is uppercase, such as EC, is displayed as registered in the dictionary 13 in the candidate word field 21.

Figure 10:
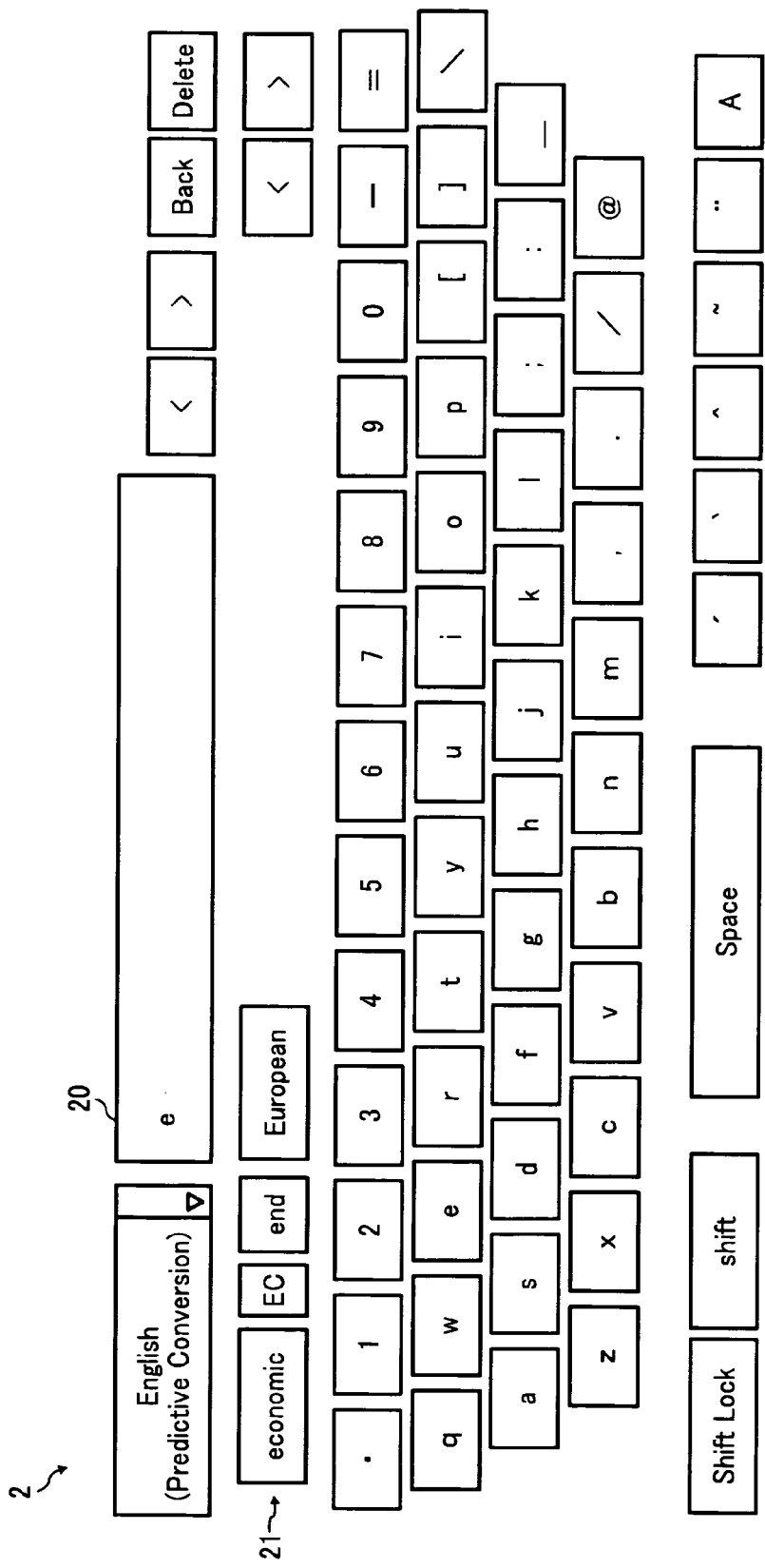
FIG. 10 illustrates examples of candidate words displayed on the software keyboard shown in FIG. 1 when the user inputs "e" in lowercase.

By contrast, FIG. 10 illustrates examples of candidate words displayed on the software keyboard 2 when the user inputs a first letter in lowercase. In this case, the candidate words are displayed as registered in the dictionary 13 in the candidate word field 21.

Thus, as shown in FIG. 10, when the user inputs a first letter "e" in the letter entry field 20, for example, "economic", "EC", "end", "European", etc., are displayed as candidate words in the candidate word field 21.

Another candidate word processing performed by the notation converter 11 shown in FIG. 1 is described below with reference to FIG. 11.

In this candidate word processing, when the notation converter 11 determines that all letters included in a letter string (word) input from the input receiver 10 is lowercase, the notation converter 11 excludes a word that includes an uppercase letter from the words retrieved from the dictionary 13 and the history storage unit 15 and outputs only words registered in lowercase.

Figure 11:
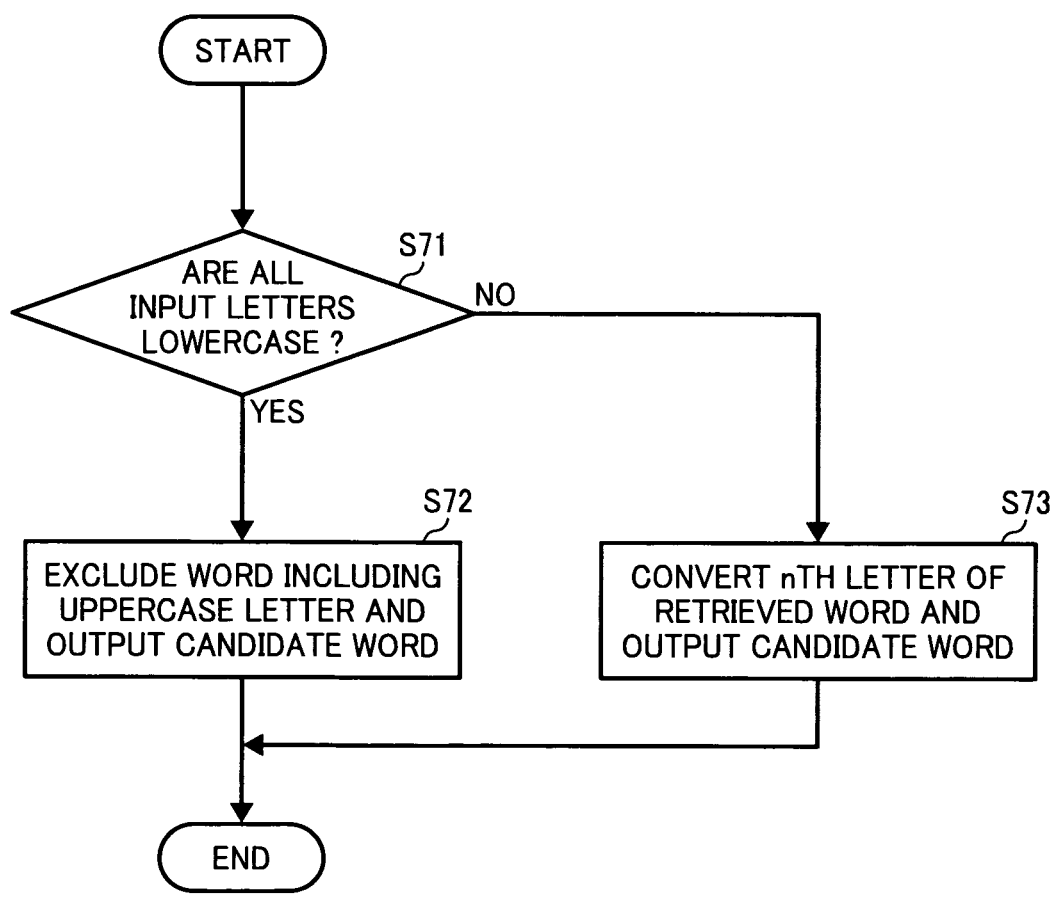
FIG. 11 illustrates another sequence of candidate word outputting processes performed by the notation converter shown in FIG. 1.

As shown in FIG. 11, when receiving a word retrieved by the search unit 12, at S71 the notation converter 11 determines whether or not all of multiple letters input by the user are lowercase. When all letters are lowercase (YES at S71), at S72 the notation converter 11 excludes a word that includes an uppercase letter from the words retrieved from the dictionary 13 and the history storage unit 15 and then outputs only words registered in lowercase as candidate words to the input receiver 10.

By contrast, when the notation converter 11 determines that the input letter string includes at least one uppercase letter (NO at S71), at S73 the notation converter 11 converts the notation of the nth letter of the word retrieved by the search unit 12 according to the notation information and then outputs that word as a candidate word at the input receiver 10. Then, processing is completed.

Thus, when all multiple letters input by the user are lowercase, words including an uppercase letter, such as proper names and abbreviations, are not displayed. In other words, candidate words that correspond to the notation used by the user can be selected.

Figure 12:
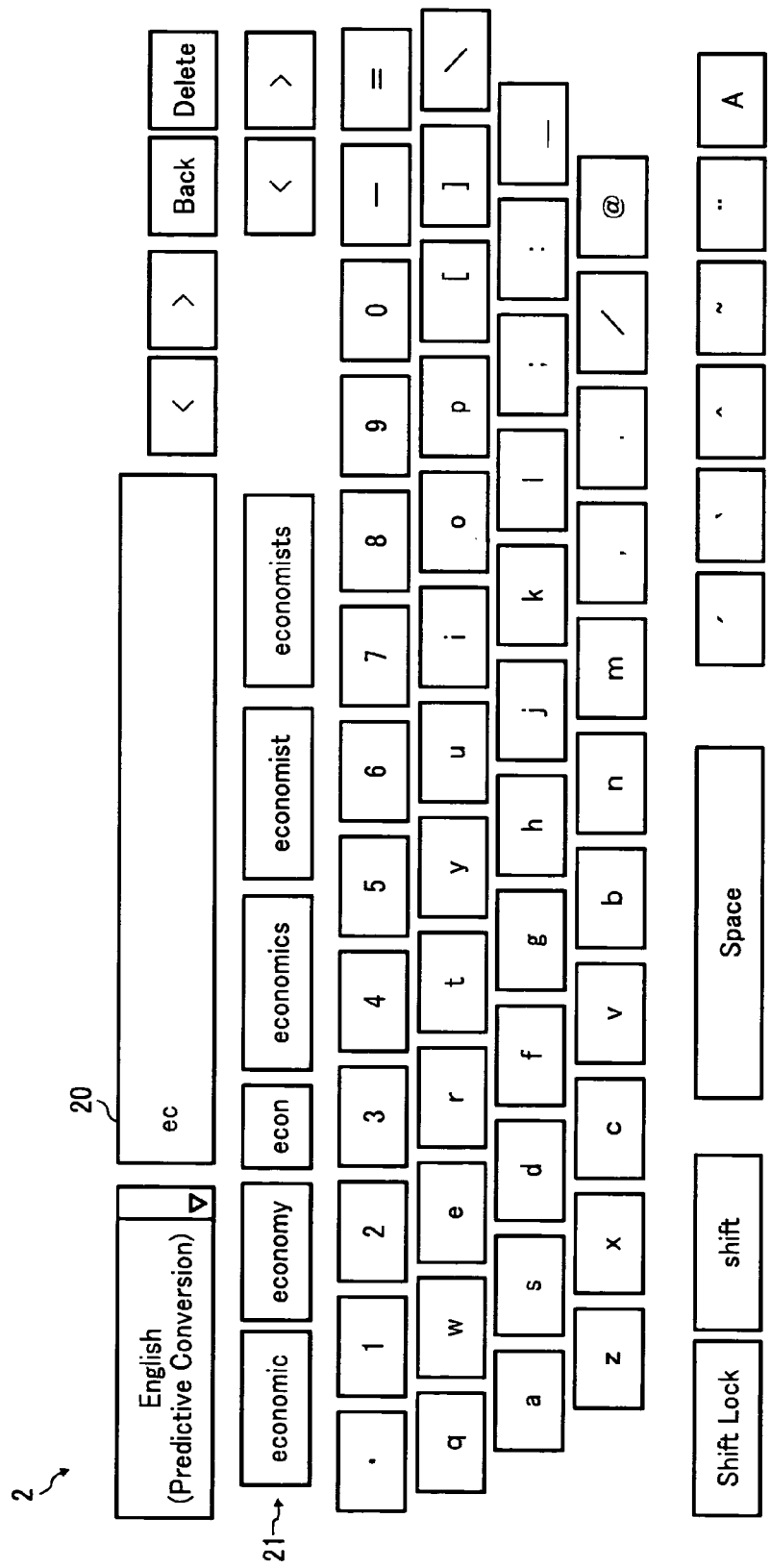
FIG. 12 illustrates an example of a display on the software keyboard shown in FIG. 1 when the user inputs multiple letters in lowercase and words including an uppercase letter, such as proper nouns, abbreviations, etc., are excluded as candidate words.

FIG. 12 illustrates an example of a display on the software keyboard 2 when the user inputs all multiple letters in lowercase. In this case, words including at least one uppercase letter are excluded from candidate words.

As shown in FIG. 12, when the user inputs "ec" in lowercase in the letter entry field 20, for example, "economic", "economy", "econ", "economics", "economist", "economists", etc., are displayed as candidate words in the candidate word field 21. From those candidate words, words including at least one uppercase letter, such as "EC", are excluded.

Figure 13:
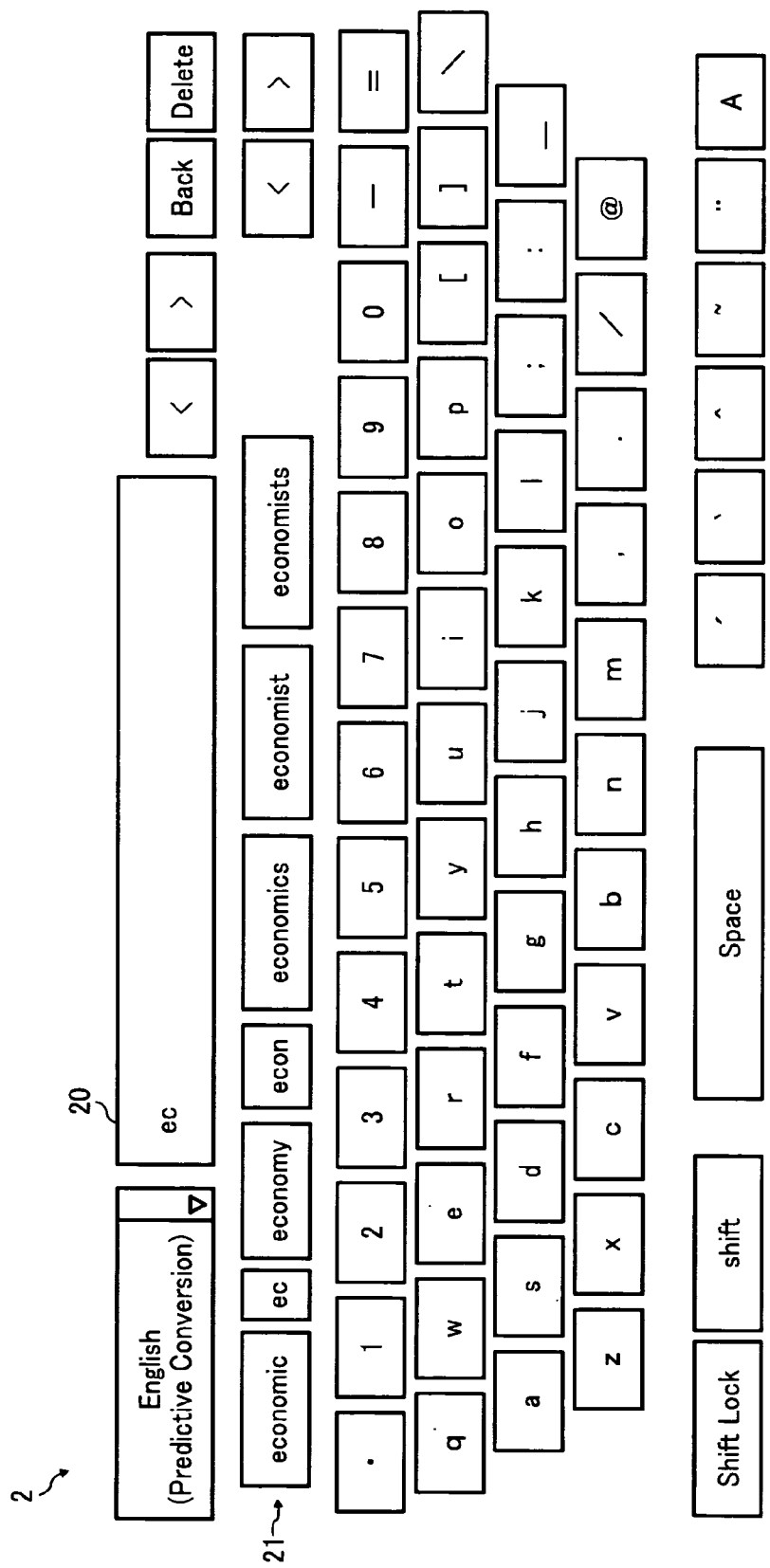
FIG. 13 illustrates an example of a display on the software keyboard shown in FIG. 1 when the user inputs multiple letters in lowercase and candidate words are displayed in lowercase.

Alternatively, when all multiple letters input by the user are lowercase, all words retrieved by the search unit 12 may be displayed in lowercase as shown in FIG. 13.

In this case, when the user inputs "ec" in lowercase in the letter entry field 20, for example, "economic", "ec", "economy", "econ", "economics", "economist", "economists", etc., are displayed as candidate words in the candidate word field 21 as shown in FIG. 13. When a word including at least one uppercase letter, such as "EC", is retrieved by the search unit 12, the notation of that word is changed, and thus "ec" in lowercase is displayed in the candidate word field 21.

Figure 14:
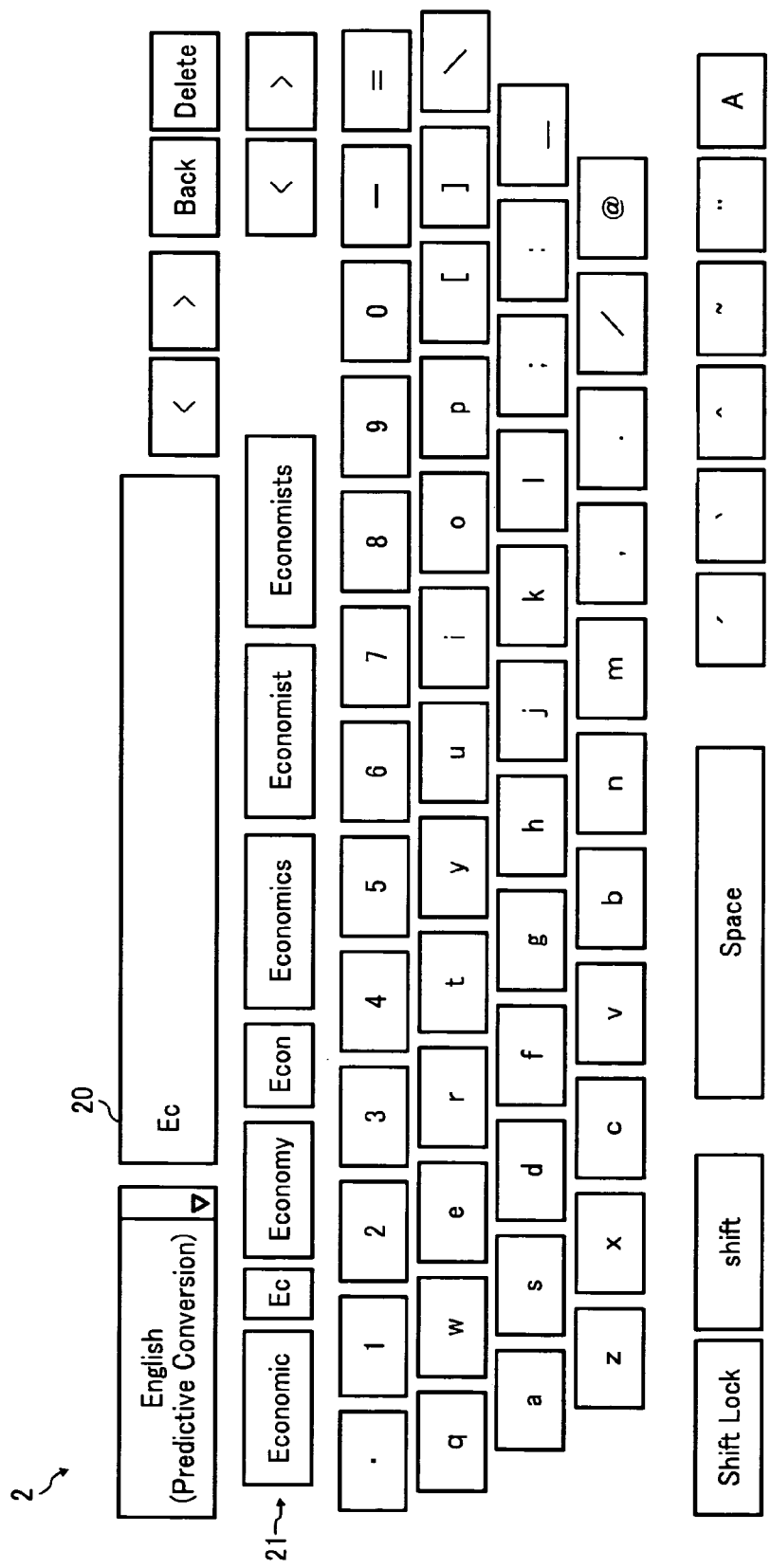
FIG. 14 illustrates examples of candidate words displayed on the software keyboard shown in FIG. 1 when a user inputs "Ec", in which a first letter is uppercase and a second letter is lowercase.

FIG. 14 illustrates examples of candidate words displayed on the software keyboard 2 when the user inputs multiple letters in a combination of at least one uppercase letter and at least one lowercase letter. In this case, the candidate words are displayed in the notation used by the user in the candidate word field 21, as described above.

As shown in FIG. 14, when the user inputs "Ec", that is, a first letter in uppercase and a second letter in lowercase, in the letter entry field 20, for example, candidate words, "Economic", "Ec", "Economy", "Econ", "Economics", "Economist", "Economists", etc., whose first letter is uppercase and second and subsequent letters are lowercase are displayed in the candidate word field 21.

Figure 15:
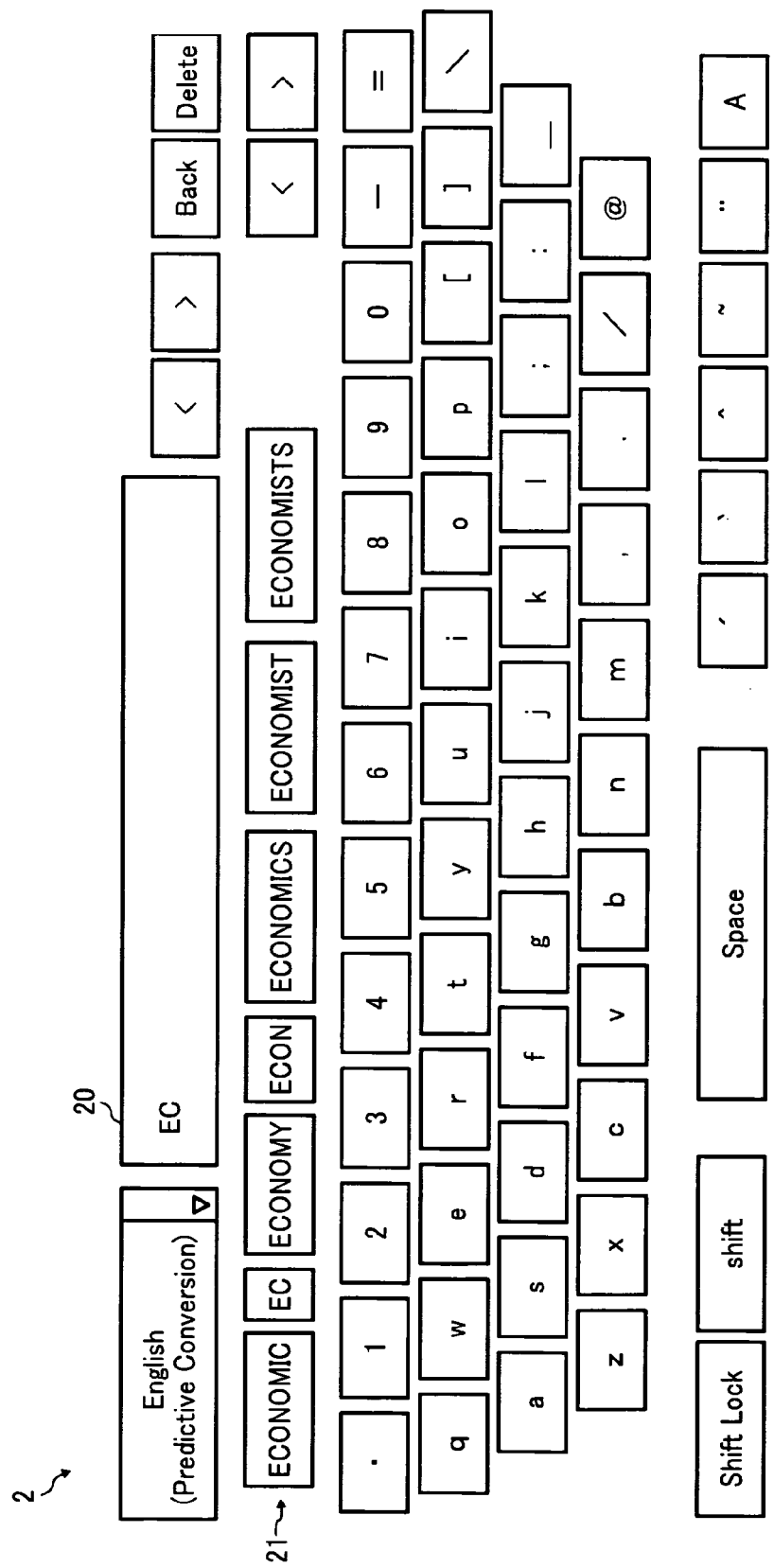
FIG. 15 illustrates examples of candidate words displayed on the software keyboard shown in FIG. 1 when a user inputs "EC" in uppercase.

FIG. 15 illustrates examples of candidate words displayed on the software keyboard 2 when the user inputs all multiple letters in uppercase. In this case, the candidate words are displayed in uppercase as described above.

As shown in FIG. 15, when the user inputs "EC" in uppercase in the letter entry field 20, for example, "ECONOMIC", "EC", "ECONOMY", "ECON", "ECONOMICS", "ECONOMIST", "ECONOMISTS", etc., are displayed as candidate words in the candidate word field 21.

Processing of letters with a diacritical mark (diacritic) is described below.

For example, in Latin, diacritics are added to letters that are pronounced in multiple ways. Examples of diacritics include umlaut, trema, accent, cedilla, and tilde.

The notation converter 11 first determines whether or not the letter input from the input receiver 10 includes a diacritic. After the notation converter 11 determines that the letter includes a diacritic, the notation converter 11 determines whether the letter is uppercase or lowercase.

Further, when the notation of a letter included in the word retrieved from the dictionary 13 or the history storage unit 15 is to be converted, the notation converter 11 determines whether or not the letter includes a diacritic and then converts its notation.

Figure 16:
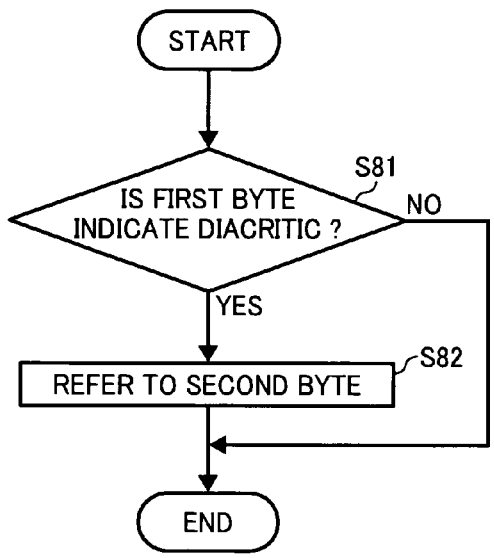
FIG. 16 illustrates a sequence of processes to handle a letter with a diacritical mark.

FIG. 16 illustrates a sequence of processes performed when a letter with a diacritic is referred to.

Such a letter with a diacritic is data of two bytes, and a first byte stores the diacritic and a second byte stores the letter itself.

Referring to FIG. 16, at S81 the notation converter 11 determines whether or not the first byte of the data of the letter indicates a diacritic. When the first byte of the data does not indicate a diacritic (NO at S81), the notation converter 11 determines that the word is without a diacritic, and then processing is completed.

By contrast, when notation converter 11 determines that the first byte of the data indicates a diacritic (YES at S81), at S82 the notation converter 11 refers to the second byte of the data of the letter and then determines whether the letter is lowercase or uppercase. Then, processing is completed after the notation converter 11 converts the notation of the letter as required.

Thus, letters with a diacritic can be handled in a way similar to the way in which typical alphabet letters are handled, by first determining letter type when the notation of the letter is to be determined or converted.

Another illustrative embodiment of the present invention is described below with reference to FIGS. 17 and 18. In this embodiment, the software keyboard includes a function to input word type, and the user can designate word type of the candidate words to be displayed.

It is to be noted that, other than the software keyboard, the present embodiment is similar to the embodiments described above with reference to FIGS. 1 through 15, and thus descriptions thereof are omitted.

As described above, each word registered in the dictionary 13 shown in FIG. 1 is associated with a word type flag indicating the type of that word, and the word type flags 0, 1, 2, 3, and 4 indicate ordinary words, names of people or companies, place-names, proper nouns other than names of people, companies, and places, and abbreviations, respectively.

Referring to FIG. 1, when the user designates word type of candidate words to be displayed, word type information is transmitted to the notation converter 11 of the language input support engine 3 through the input receiver 10. The notation converter 11 outputs, as candidate words, only words whose word type flags indicate the word type designated by the user from the words retrieved from the dictionary 13 by the search unit 12.

Figure 17:
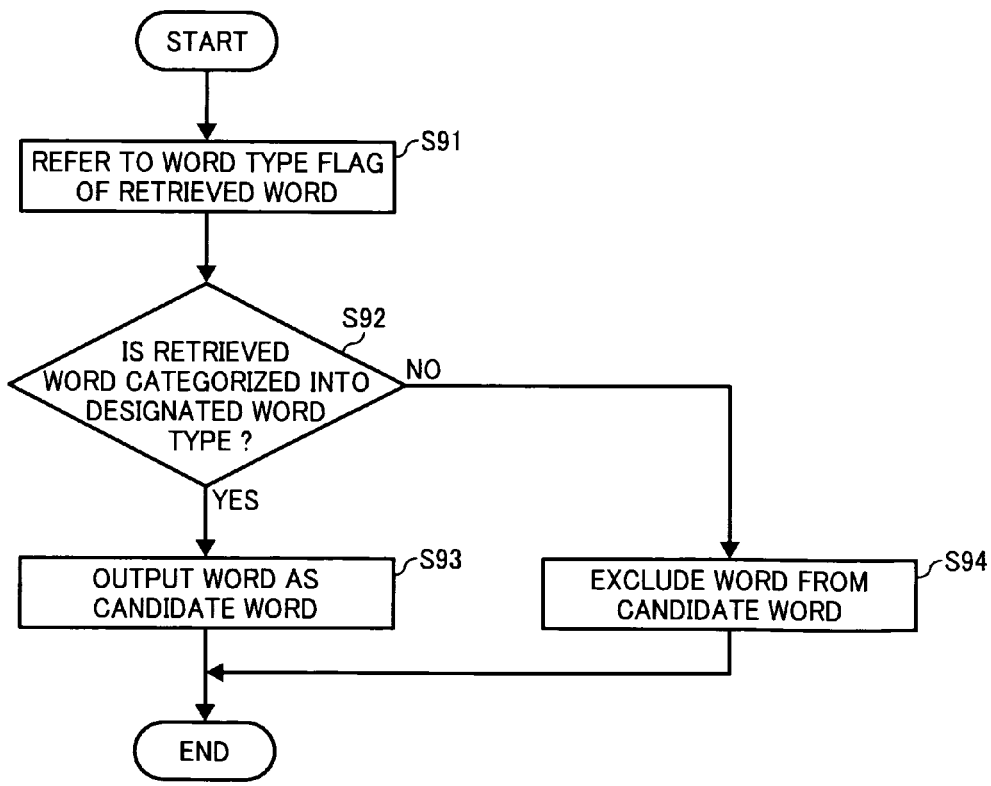
FIG. 17 illustrates a sequence of processes performed by the notation converter shown in FIG. 1 when the user designates the type of candidate words.

FIG. 17 illustrates a sequence of processes performed by the notation converter 11 to output only words that are categorized into a designated word type as candidate words.

As shown in FIG. 17, at S91 the notation converter 11 refers to the word type flag of the word retrieved by the search unit 12 and, at S92, determines whether or not that word is categorized into the word type input by the user through the input receiver 10.

When the word type flag of the retrieved word indicates the designated word type (YES at S92), at S93 the notation converter 11 outputs the retrieved word as a candidate word to the input receiver 10 and then completes processing.

By contrast, when the word type of the retrieved word is not the designated word type (NO at S92), at 94 the notation converter 11 excludes that word from the candidate words and then completes processing.

Thus, the software keyboard displays only the candidate words that are categorized into the word type designated by the user.

It is to be noted that, alternatively, the notation converter 11 may transmit the word type designated by the user to the search unit 12, and the search unit 12 may be configured not to retrieve words that are not categorized into the designated word type from the dictionary 13 and the history storage unit 15.

As described above, only the candidate words whose word type is identical to the designated word type can be displayed by associating each word with a word type flag in the dictionary 13 and the history storage unit 15 and predesignating a word type of candidate words. Thus, the user can easily find a target word.

Figure 18:
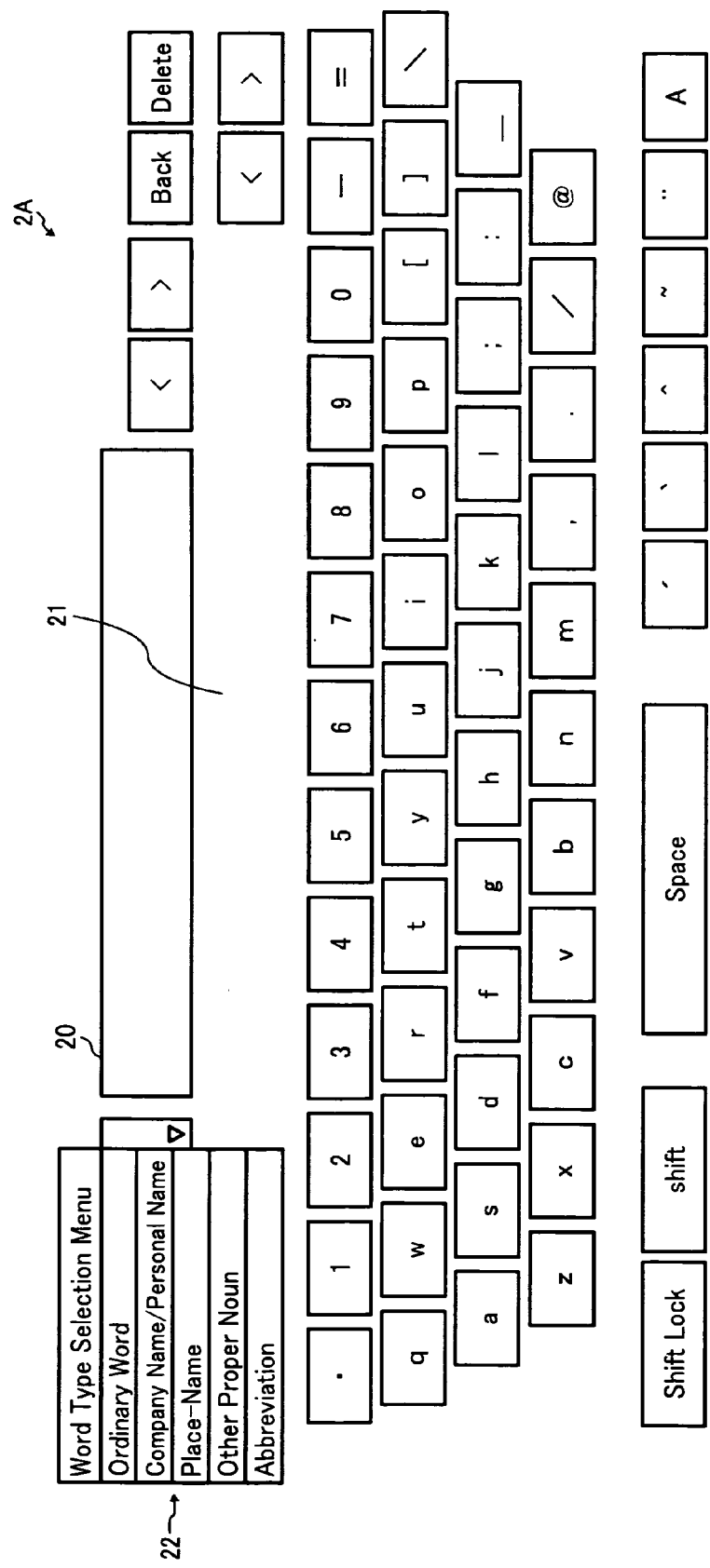
FIG. 18 illustrates an example of a display on the software keyboard shown in FIG. 1 when the user designates the type of candidate words.

FIG. 18 illustrates an example of a display on a software keyboard 2A including a word type selection menu 22 in addition to a letter entry field 20 and a candidate word field 21.

Referring to FIG. 18, the user can select one of "Ordinary word", "Company Name/Personal Name", "Place-Name", "Other Proper Noun", and "Abbreviation" from the word type selection menu 22. For example, when the user selects "Ordinary word" before or after inputting a letter or letter string in the letter entry field 20, only ordinary words corresponding to that letter or letter string are displayed as candidate words in the candidate word field 21.

It is to be noted that the word types described above are only examples, and accordingly other word types can be set as desired.

Another illustrative embodiment of the present invention is described below with reference to FIGS. 19 and 20.

Figure 19:
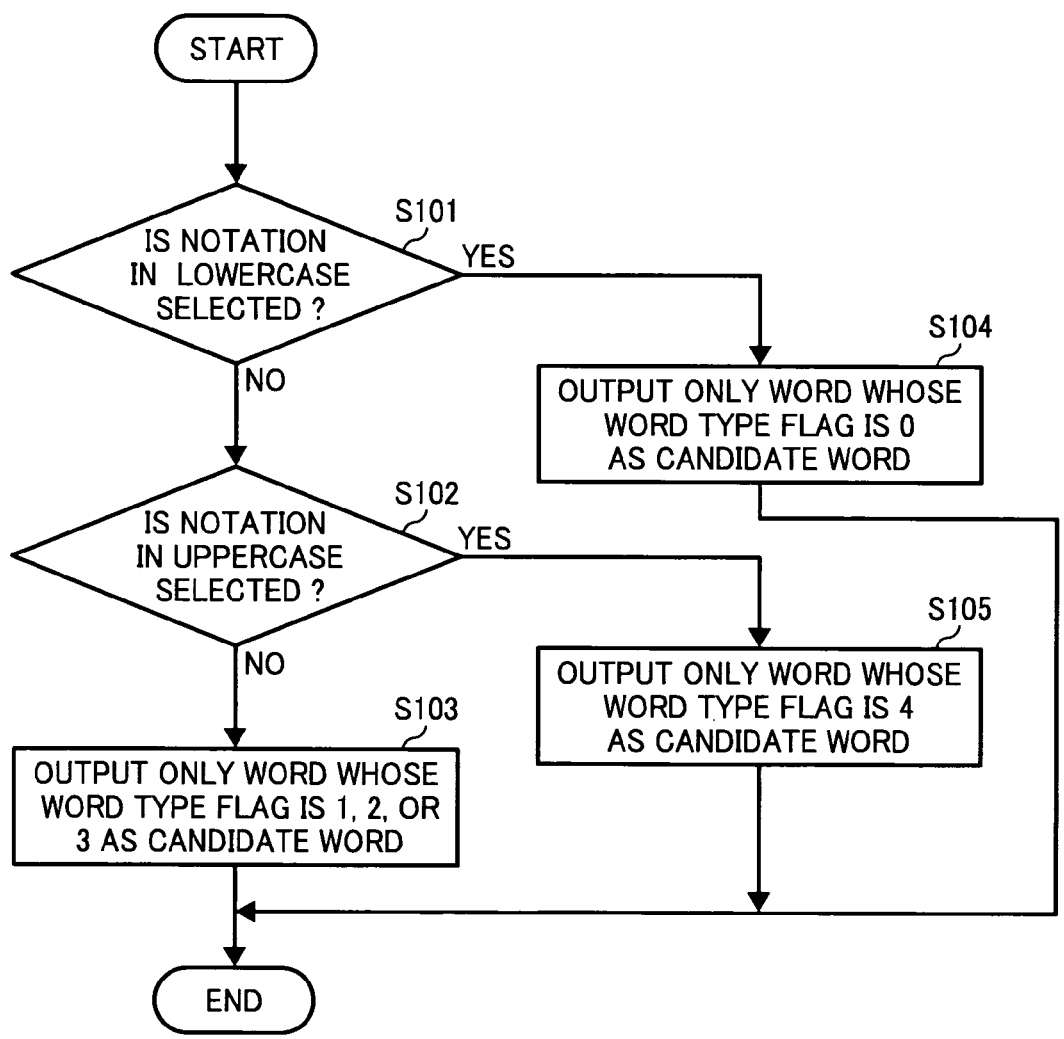
FIG. 19 illustrates a sequence of processes performed by the notation converter shown in FIG. 1 to output only words whose notations are identical to the notation designated by the user as candidate words.

FIG. 19 illustrates a sequence of processes performed by the notation converter 11 when only words that correspond to the notation selected by the user are output as candidate words. FIG. 20 illustrates an example of a display on a software keyboard 2B including a notation selection menu 23.

Figure 20:
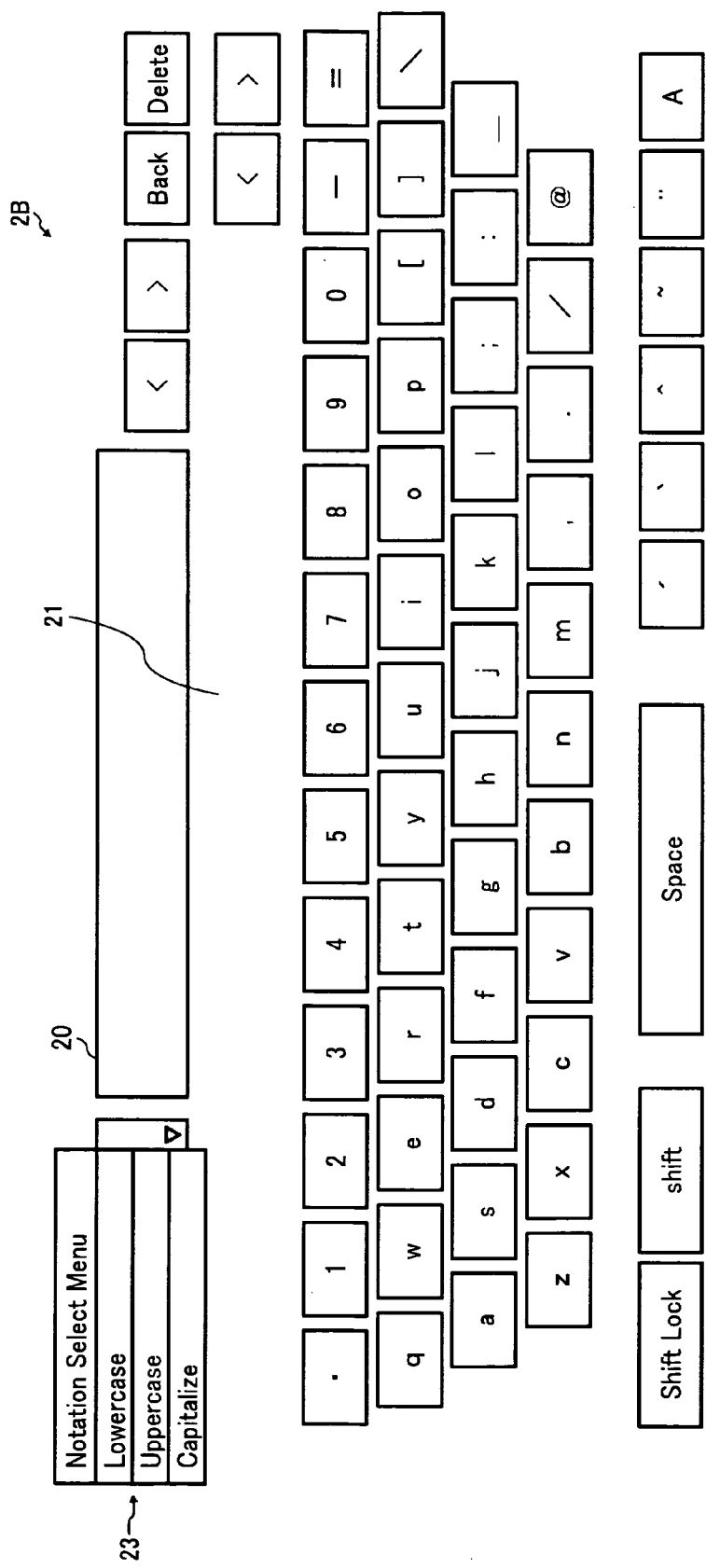
FIG. 20 illustrates an example of a display on the software keyboard shown in FIG. 1 when the user designates the notation of candidate words.

In this embodiment, the software keyboard 2B shown in FIG. 20 includes the notation selection menu 23 as a function to input a notation of candidate words to be displayed, in addition to a letter input field 20 and a candidate word field 21. Other than the software keyboard 2B, the present embodiment is similar to the embodiments described above with reference to FIGS. 1 through 15, and thus descriptions thereof are omitted.

Referring to FIG. 20, for example, the user can select, as a notation of the candidate words, one of "Lowercase" indicating all letters are lowercase, "Uppercase" indicating all letters are uppercase, and "Capitalize" indicating that the only the first letter is uppercase from the notation selection menu 23.

Referring to FIG. 1, when the user designates the notation, the notation converter 11 outputs, as candidate words, only words whose notation is identical to the notation selected by the user from the words retrieved from the dictionary 13 and the history storage unit 15 by the search unit 12.

Referring to FIGS. 19 and 20, when the user inputs a notation of candidate words before or after inputting a letter or letter string, the notation information is transmitted to the notation converter 11 through the input receiver 10. At S101, the notation converter 11 determines whether or not the user has selected "Lowercase" in which all letters are lowercase from the notation selection menu 23.

When the notation converter 11 determines that "Lowercase" is selected (YES at S101), at S104, the notation converter 11 outputs only words whose word type flag indicates "0" from the words retrieved by the search unit 12 to the input receiver 10 and then completes processing. Thus, only ordinary words, which are registered in lowercase, are displayed on the candidate word field 21.

By contrast, when the notation converter 11 determines that "Lowercase" is not selected (NO at S101), at S102 the notation converter 11 further determines whether the user has selected "Uppercase".

When the notation converter 11 determines that "Uppercase" is selected from the notation selection menu 23 (YES at S102), at S105, the notation converter 11 outputs only words whose word type flag indicates "4" from the words retrieved by the search unit 12 to the input receiver 10 and then completes processing.

By contrast, when the notation converter 11 determines that "Uppercase" is not selected (NO at S102), at S103 the notation converter 11 outputs only words whose word type flag indicates one of "1", "2", and "3" from the words retrieved by the search unit 12 to the input receiver 10 and then completes the processes.

It is to be noted that, alternatively, the notation converter 11 may transmit the notation designated by the user to the search unit 12, and the search unit 12 may be configured not to retrieve words whose notation is different from the designated notation from the dictionary 13 and the history storage unit 15.

As described above, by adding the notation selection menu 23 to the software keyboard 2B, the user can select the notation of candidate words to be displayed, which saves time when the user knows the notation of the word to input.

Alternatively, the notation converter 11 may be configured to convert the words retrieved by the search unit 12 from the dictionary 13 and the history storage unit 15 into the notation selected by the user and outputs the converted words as candidate words.

For example, when the user inputs a letter or letter string in the letter entry field 20 and selects "Lowercase" from the notation selection menu 23, the search unit 12 retrieves words corresponding to that letter or letter string from the dictionary 13 and the history storage unit 15. Then, the notation converter 11 converts uppercase letters included in the retrieved words into lowercase letters if any, and outputs those words as candidate words. Thus, all the words retrieved by the search unit 12 are displayed in lowercase in the candidate word field 21.

It is to be noted that the notations described above are only examples, and accordingly other notations can be set as desired.

Further, although the descriptions above concern English, the embodiments of the present invention can accommodate other foreign languages, such as French, German, etc., in which each word is composed of a combination of multiple letters equivalent to alphabets.

The embodiments described above can be implemented by a program that causes a computer to perform various functions described above, and the program can be stored on a computer-readable recording medium.

Numerous additional modifications and variations are possible in light of the above teachings. It is therefore to be understood that, within the scope of the appended claims, the disclosure of this patent specification may be practiced otherwise than as specifically described herein.

What is claimed is:

1. An information processing apparatus, comprising:
an input unit through which a letter or a string of letters are sequentially input;
a determination unit configured to determine whether a given letter input through the input unit is uppercase or lowercase;
an output unit configured to output a candidate word corresponding to an input string of letters in the order in which the letters are input through the input unit each time a letter is input, the output unit outputting the candidate word according to a result generated by the determination unit, the notation of each letter of the candidate word in conformity with notation of each letter of the input string of letters; and
a history storage unit configured to store a history of the word selected from the candidate words output by the output unit and a notation of the selected word, wherein,
the history storage unit stores the selected word and the notation of the selected word in association with a preceding word that is confirmed prior to the selected word and a notation of the preceding word, and
the selected word is output in the notation stored in the history storage unit as a candidate word subsequent to the preceding word next time the preceding word displayed in the notation stored in the history storage unit is confirmed.

2. The information processing apparatus according to claim 1, further comprising a notation select unit through which a notation is selected,
wherein the output unit outputs, as candidate words, only words registered in the notation selected through the notation selection unit from the words included in the result generated by the determination unit.

3. The information processing apparatus according to claim 1, wherein, when no candidate word is selected and a word input through the input unit is confirmed, the dictionary stores the confirmed word and a notation of the confirmed word, and
when the word is retrieved from the dictionary, the output unit outputs the word in the notation stored in the dictionary.

4. The information processing apparatus according to claim 1, wherein, when all letters of the string of the letters input through the input unit are lowercase, the output unit excludes a word including an uppercase letter from the words retrieved from the result generated by the determination unit.

5. The information processing apparatus according to claim 1, wherein, when one or more of the letters of the candidate word are not input yet, the output unit sets a notation of the letter not input according to notation information most recently input by the input unit.

6. The information processing apparatus according to claim 1, further comprising:
a dictionary, configured to store each word in one of uppercase, lowercase, and a combination of at least one uppercase letter and at least one lowercase letter;
a storage unit configured to store notation information indicating whether the letter is uppercase or lowercase as determined by the determination unit;
a search unit configured to search the dictionary for a word corresponding to an input string of letters in the order in which the letters are input through the input unit each time a letter is input;
a converter configured to convert a notation of each letter included in the word retrieved by the search unit according to the notation information stored in the storage unit,
wherein the output unit is configured to output the word whose notation is converted by the converter as the candidate word.

7. The information processing apparatus according to claim 6, wherein, when converting the notation of the word retrieved by the search unit, the converter sets a notation of a letter whose notation information is not stored according to notation information most recently stored in the storage unit.

8. The information processing apparatus according to claim 6, wherein, when a first letter input through the input unit is lowercase, the converter does not convert the notation of the word retrieved by the search unit, and
the output unit outputs the word in a notation stored in the dictionary as a candidate word.

9. The information processing apparatus according to claim 6, wherein each word is associated with a search key that is identical to the word in lowercase in the foreign language dictionary, the string of letters input through the input unit is converted into lowercase letters, and the search unit searches for a word associated with a search key whose first letter is identical to a first letter of the string of the letters input through the input unit.

10. The information processing apparatus according to claim 6, further comprising a word type input unit through which word type is input, wherein the dictionary stores each of the multiple words in association with a word type flag that indicates a word type, and the output unit outputs, as candidate words, only words associated with the word type flag indicating the word type input through the word type input unit from the words retrieved from the dictionary.

11. The information processing apparatus according to claim 6, further comprising a history storage unit configured to store a history of the word selected from the candidate words and a notation of the selected word, wherein the search unit searches the history storage unit for the word corresponding to the string of the letters input through the input unit, and when the word is retrieved from the history storage unit, the output unit outputs the word in the notation stored in the history storage unit.

12. An information processing method, comprising:

inputting a letter or a string of letters sequentially;

determining whether a given letter is uppercase or lowercase; and outputting a candidate word corresponding to an input string of letters in the order in which the letters are input each time a letter is input, the candidate word including notation of each letter of the candidate word in conformity with notation of each letter of the input string of letters;

storing a history of a word selected from the candidate words and a notation of the selected word, the history including the selected word and the notation of the selected word in association with a preceding word that is confirmed prior to the selected word and a notation of the preceding word; and outputting the selected word in the notation stored as a candidate word subsequent to the preceding word next time the preceding word displayed in the notation stored in the history is confirmed.

13. An information processing apparatus, comprising:

an input unit through which a letter or a string of letters are sequentially input;

a determination unit configured to determine whether a given letter input through the input unit is uppercase or lowercase;

an output unit configured to output a candidate word corresponding to an input string of letters in the order in which the letters are input through the input unit each time a letter is input, the output unit outputting the candidate word according to a result generated by the determination unit, the notation of each letter of the candidate word in conformity with notation of each letter of the input string of letters;

a dictionary, configured to store each word in one of uppercase, lowercase, and a combination of at least one uppercase letter and at least one lowercase letter;

a storage unit configured to store notation information indicating whether the letter is uppercase or lowercase as determined by the determination unit;

a search unit configured to search the dictionary for a word corresponding to an input string of letters in the order in which the letters are input through the input unit each time a letter is input;

a converter configured to convert a notation of each letter included in the word retrieved by the search unit according to the notation information stored in the storage unit, wherein the output unit is configured to output the word whose notation is converted by the converter as the candidate word, the determination unit determines whether or not the letter input through the input unit is uppercase or lowercase after determining whether or not a diacritic is added to the letter, and when converting the notation of each letter included in the word retrieved from the dictionary, the converter converts the notation of the letter after determining whether or not a diacritic is added to the letter.

* * * * *